Aug. 23, 1938.  A. E. CARLILE  2,127,839
SEPARABLE INTERLOCKING FASTENER AND METHOD OF MAKING THE SAME
Filed July 12, 1933
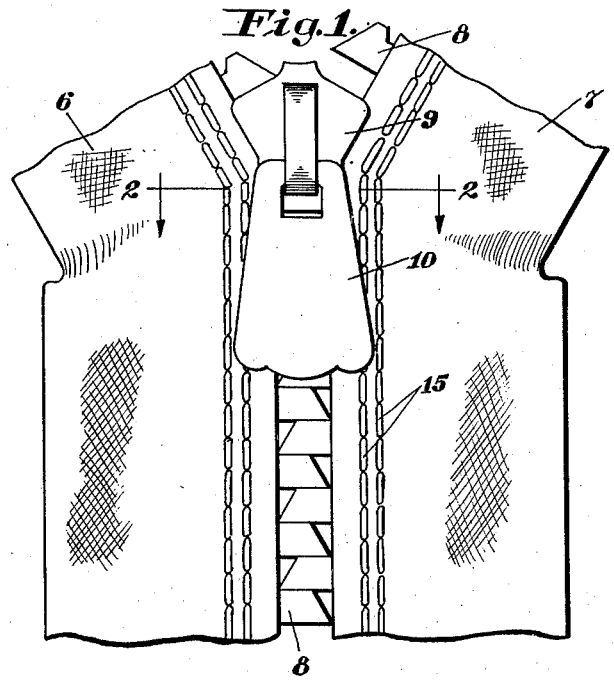
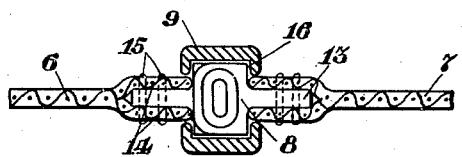
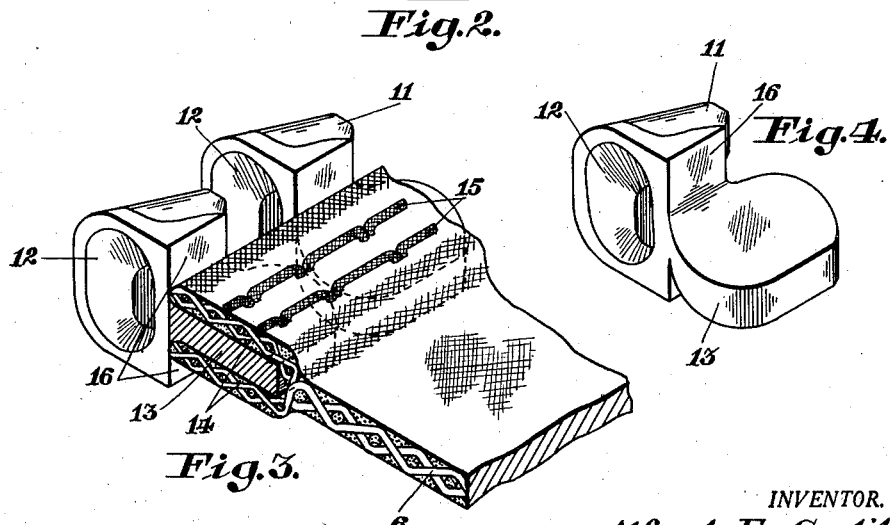
INVENTOR.
Alfred E. Carlile
BY Kelley + Chisholm.
ATTORNEYS.

Patented Aug. 23, 1938

2,127,839

UNITED STATES PATENT OFFICE 2,127,839

SEPARABLE INTERLOCKING FASTENER AND METHOD OF MAKING THE SAME

Alfred E. Carlile, Meadville, Pa., assignor to Talon, Inc., a corporation of Pennsylvania Application July 12, 1933, Serial No. 680,107

2 Claims. (Cl. 24—205)

My invention relates to the separable interlocking fasteners and methods of making the same and has particular reference to the attachment of the individual fastener members to a flexible support.

It is an object of the invention to provide a simple and effective means of attaching fastener members on a flexible support in uniformly spaced relation without substantial distortion of the fastener members.

More particularly my invention provides a fastener in which the individual fastener members are attached to the flexible supports by stitching. Preferably the arrangement is such that one or more continuous rows of stitching extending along the edge of the tape penetrate the attaching portions of the fastener members.

In the accompanying drawing I have shown for purposes of illustration one embodiment which my invention may assume in practice. In the drawing:

Fig. 1 is a general view of a fastener structure in accordance with my invention;

Fig. 2 is a cross-section on line 2—2 of Fig. 1;

Fig. 3 is a perspective view showing certain details;

Fig. 4 is a perspective view of an individual fastener member.

The fastener members are formed of a material which will allow the passage of a needle through a relatively thin section. Preferably the fastener members are made from a non-metallic material such as cellulose acetate or cellulose nitrate.

In the particular fastener illustrated there is provided a pair of flexible supports, herein fabric tapes 6, 7 having attached thereto fastener members generally indicated by the numeral 8. Such fastener members are closely and uniformly spaced and adapted to be brought together and interlocked by means of a slider 9 actuated by a pull tab 10. The shape of the interlocking fastener members may vary and the particular form shown is similar to that of a well-known slide fastener. The interlocking portion which projects from the edge of the flexible supports comprises a projection 11 on one side and a recess 12 on the opposite side. The attaching portion may comprise a single or double flat portion herein designated 13, which is adapted to overlap an edge of the tape. As herein shown, each tape is bifurcated to provide edges 14, on opposite sides of the flat section 13 of the fastener members. If desired the tape can be of single thickness with the attaching portion of the fastener member overlapping the same. Also a bifurcated attaching portion may be provided on the fastener member to be placed astride the edge of the tape. The fastener members are next attached in place by means of one or more rows of stitches, herein designated 15, extending through the flat portions of the fastener members. The flat portions are formed wider and shaped as indicated in Fig. 4, in order that there may be more surface for receiving stitches and at the same time, allow for the proper degree of flexibility between the fastener members during opening and closing of the fastener.

In the form illustrated, the slider is relatively narrow and rides on the shoulders 16 as clearly shown in Fig. 2.

As a result of my invention it will be apparent that an effective means for attaching the fastener members to the tape has been provided. It is merely necessary to arrange the fastener members and hold them in proper relation on the tape, and pass the assembly through a sewing machine of the proper type. The needle will readily penetrate the non-metallic portions of the fastener members and a secure attachment can be provided by the use of sufficiently strong threads.

While I have in this application specifically shown and described one embodiment which my invention may assume in practice, it will be understood that this embodiment is merely for the purposes of illustration and description and that various other forms may be devised within the scope of my invention as specifically set forth in the appended claims.

What I claim as my invention is:

1. A separable interlocking fastener of the class described comprising a pair of flexible supports, cooperating series of fastener members arranged in uniformly spaced relation along the edge of said supports, said members being made from non-metallic material having portions projecting from the tape adapted to interlock with similar members on the opposite tape, and other relatively thin flat portions overlapping said support, said thin portions having curved extensions extending longitudinally along the tapes to provide a substantially continuous line of the non-metallic material, and a continuous row of stitches passed through said flat portions to hold them in position on said tapes.

2. A fastener member for separable interlocking fasteners of the type described, having an interlocking portion and an integral attaching portion made of non-metallic material, the attaching portion comprising a flat solid extension of such thinness as to be pierceable by a sewing machine needle, the interlocking portion being of greater thickness and providing shoulders against which a slider can bear.

ALFRED E. CARLILE.